(12) United States Patent
Yoshida et al.

(10) Patent No.: US 8,171,676 B2
(45) Date of Patent: May 8, 2012

(54) CONSTRUCTION OF NUCLEAR POWER PLANT BUILDING AND CONSTRUCTION METHOD THEREOF

(75) Inventors: Soichi Yoshida, Kanagawa-ken (JP); Munetaka Takahashi, Kanagawa-ken (JP); Hiroshi Yamazaki, Kanagawa-ken (JP); Eiichi Tanaka, Tokyo (JP); Kishio Sano, Tokyo (JP); Yoshinori Mihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 12/754,980

(22) Filed: Apr. 6, 2010

(65) Prior Publication Data

US 2011/0041419 A1    Feb. 24, 2011

(30) Foreign Application Priority Data

Aug. 21, 2009  (JP) ................ P2009-192437

(51) Int. Cl.
*E04B 7/08* (2006.01)
(52) U.S. Cl. ........... 52/80.1; 52/81.1; 52/81.4; 52/81.5; 52/81.6

(58) Field of Classification Search .............. 52/80.1, 52/745.06, 745.09, 250, 575, 81.1, 81.2, 52/81.4, 81.5, 81.6, 82
See application file for complete search history.

(56) References Cited

U.S. PATENT DOCUMENTS

| | | | |
|---|---|---|---|
| 4,328,651 A * | 5/1982 | Gutierrez | 52/293.1 |
| 5,063,299 A * | 11/1991 | Efferding | 250/507.1 |
| 7,424,756 B2 * | 9/2008 | Van Raemdonck | 5/81.1 R |
| 2008/0152067 A1 | 6/2008 | Goda et al. | |

FOREIGN PATENT DOCUMENTS

| | | |
|---|---|---|
| JP | 02-281192 A | 11/1990 |
| JP | 2001-042076 A | 2/2001 |
| JP | 2008-157744 A | 7/2008 |

* cited by examiner

*Primary Examiner* — Mark Wendell
(74) *Attorney, Agent, or Firm* — Foley & Lardner LLP

(57) ABSTRACT

A nuclear power plant building includes a building body portion and a roof covering over the building body portion. The building body portion is formed in a rectangular shape in plane cross section by four outer walls. The roof is of a shell construction. In addition, corner walls each to bridge between the adjacent outer walls or to bridge between the roof and the outer wall are provided at angle portions of the body portion of the building.

1 Claim, 11 Drawing Sheets

CONSTRUCTION OF NUCLEAR POWER PLANT BUILDING AND CONSTRUCTION METHOD THEREOF

CROSS REFERENCE TO RELATED APPLICATION

This application is based upon and claims the benefit of priority from the prior Japanese Patent Application No. 2009-192437, filed on Aug. 21, 2009, the entire contents of which are incorporated herein by reference.

FIELD OF THE INVENTION

The present invention relates to a construction of a nuclear power plant building and a construction method thereof, and more particularly to a construction of a building used for a boiling water reactor (BWR) and a construction method thereof.

DESCRIPTION OF THE BACKGROUND

Regarding a light-water reactor presently used in our country, there are two kinds of a pressurized water reactor (PWR) and a boiling water reactor (BWR).

Regarding a containment vessel of a pressurized water reactor, one with a cylindrical configuration is used so as to grant a withstand pressure capability. Accordingly, its upper structure is formed in a semispherical shape (dome shape) so as to cover the cylindrical portion. (JP-A 2008-157744 (KO-KAI), for example).

On the other hand, as it is not necessary to grant a withstand pressure capability to a building used for a boiling water reactor, a building body is made as a rectangular shape in plane cross section by the reason for easiness and so on in constructing the building.

For this reason, a roof of a nuclear power plant building used for a boiling water reactor is generally formed in a planer shape or in a convex three dimensional shape so as to cover over the rectangular building body portion (JP-A 2001-42076, JP-A H2-281192 (KOKAI), for example).

This roof is of a steel truss structure so as to strive for weight saving, and its material is composed of reinforced concrete or iron plate.

The above-described nuclear power plant building is sited at a spot where it is not necessary to stochastically consider an incoming flying object such as a falling of a large-size commercial airplane or a fighter plane.

Thus, for the conventional nuclear power plant building, a collision with an airplane is not considered in its design condition.

However, in case that a building is sited at a spot where it is necessary to consider stochastically an incoming flying object, or in case that it is necessary to consider a falling of an airplane in its design condition assuming terrorism and so on, there is a possibility not to guarantee a safety function of the nuclear power plant in case of the collision with an incoming flying object.

As a correspondence example to guarantee the safety function, it is considered to construct a building by walls and a ceiling with an enough thickness not to generate penetration, scabbing and so on in case that an incoming flying object collides against the building to store a system and an equipment having the safety function. The scabbing means the ejection of irregular pieces of the rear face as a result of the incoming flying object.

An enough thickness of the building construction in case that an incoming flying object collides depends on many conditions. When Chang formula is used which is an evaluation formula relating to a marginal thickness for the scabbing of the rear face caused by an engine collision, a calculation result is obtained that a necessary thickness is 2.0 meters at maximum including an allowance in case of the collision at right angle and in case that concrete strength per unit area is 30 mega pascals. Though there is no possibility that an incoming flying object collides against the roof of the building from the perpendicular direction in reality, it is considered that an enough thickness of the building construction is as many as 1.5 meters in case that an incoming flying object collides.

As an uppermost floor of a boiling for a boiling water reactor is an operating floor that is a large space, it is impossible to install supports for the roof in the vicinity of the center of the operating floor in view of the structure of a nuclear reactor building.

However in case of such a nuclear power plant building where supports are not installed in the vicinity of the center under the roof, if it is tried to construct the building with walls and a ceiling with an enough thickness not to generate penetration and scabbing of the rear face and so on caused by the collision with an incoming flying object, there was a problem that in a roof with a conventional shape such as a planer shape or a convex three dimensional shape, a deflection is generated by a self-weight of a roof with an increased thickness and a formation property in its structure is lowered.

On the other hand, though a roof of a semispherical shape (dome shape) can be formed easily for its construction in case where the body portion is of a cylindrical shape such as in a pressurized water reactor, there was a problem that in case that the building body portion is of a rectangular shape, a formation property in its structure of the building is lowered after all for the reason of a mismatch at the junction of the building body portion and the roof portion.

SUMMARY OF THE INVENTION

According to a first aspect of the invention, a nuclear power plant building includes a building body portion and a roof covering over the building body portion. The building body portion is formed in a rectangular shape in plane cross section by four outer walls. The roof is of a shell construction. In addition, corner walls each to bridge between the adjacent outer walls or to bridge between the roof and the outer wall are provided at angle portions of the body portion of the building.

According to a second aspect of the invention, a method of constructing a nuclear power plant building includes constructing outer walls and building walls; installing temporary supports to the outer walls and the building walls; laying down roof steel beams on the temporary supports; constructing roof slabs separately from the outer walls side; and removing the temporary supports.

According to a third aspect of the invention, a method of constructing a nuclear power plant includes constructing outer walls and building walls; installing a crane to the building walls; installing temporary supports to the building walls and the crane; laying down roof steel beams on the temporary supports; constructing roof slabs separately from the outer walls side; and removing the temporary supports.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 9A shows a first process. FIG. 9B shows a second process. FIG. 9C shows a third process. FIG. 9D shows a fourth process. FIG. 9E shows a fifth process. FIG. 9F shows a sixth process.

FIG. 10A shows a first process. FIG. 10B shows a second process. FIG. 10C shows a third process. FIG. 10D shows a fourth process. FIG. 10E shows a fifth process. FIG. 10F shows a sixth process. FIG. 10G shows a seventh process.

DETAILED DESCRIPTION OF THE EMBODIMENTS

Hereinafter, embodiments of a structure of a nuclear power plant building according to the present invention will be described with reference to the drawings.

First Embodiment

Figure 1:
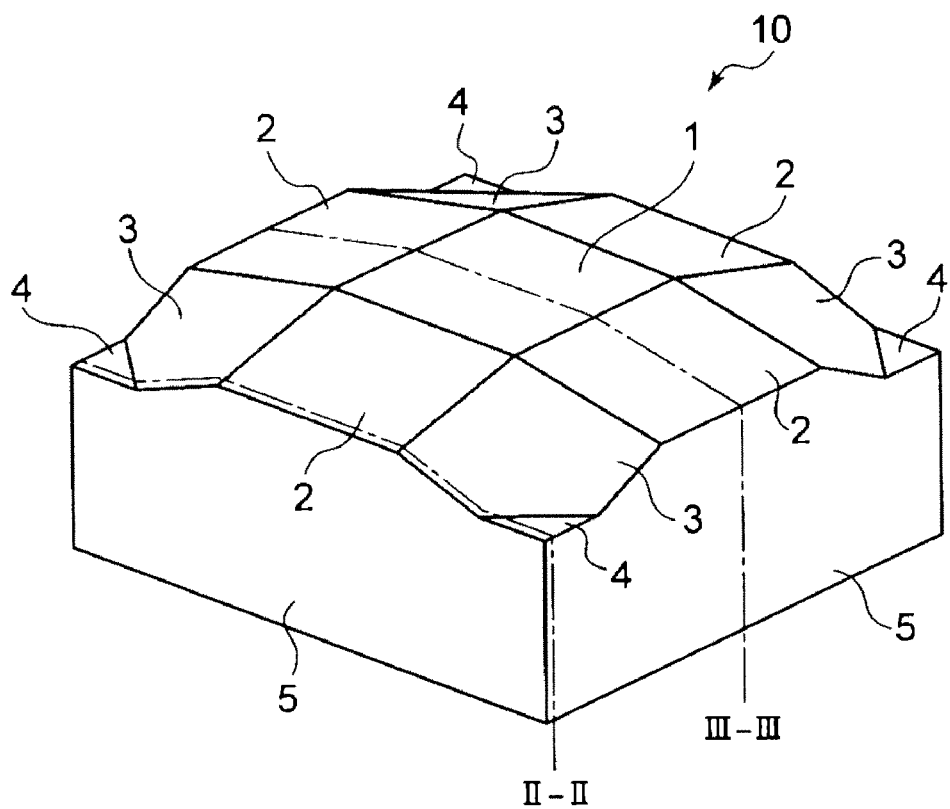
FIG. 1 is a perspective view showing a construction of a nuclear power plant building according to a first embodiment of the present invention.

A perspective view of a construction of a nuclear power plant building according to a first embodiment of the present invention is shown in FIG. 1. In addition, a view of a cross section cut off along a line II-II in FIG. 1 and a view of a cross section cut off along a line III-III in FIG. 1 are shown in FIG. 2 and FIG. 3, respectively.

In a nuclear power plant building 10, a roof of a multifaceted flat plate shell construction with a dimension of about 60 meters square covers over a space of a square shape in plane cross section formed by four flat plane-like outer walls 5. That is, the roof is provided with a roof horizontal slab 1 locating at the central portion, roof oblique slabs 2 arranged around it, corner oblique slabs 3 arranged at the oblique positions of the roof horizontal slab 1, and corner horizontal slabs 4 arranged at the end portions of the corner oblique slabs 3 and at the four angles of the roof.

The roof horizontal slab 1, the roof oblique slabs 2, the corner oblique slabs 3, and the corner horizontal slabs 4 are each formed by a reinforced concrete plate with a thickness of about 1.5 meters. In addition, the outer walls are each formed by a reinforced concrete plate with a thickness of about 2 meters.

Figure 2:
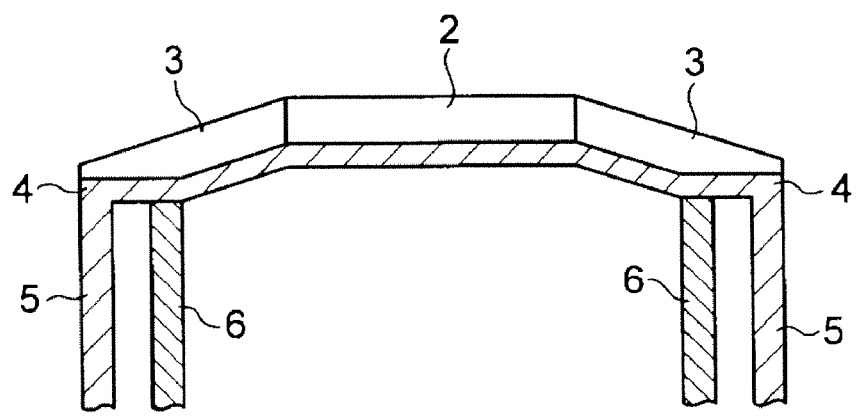
FIG. 2 is a view of a cross section cut off along a line II-II in FIG. 1.
Figure 3:
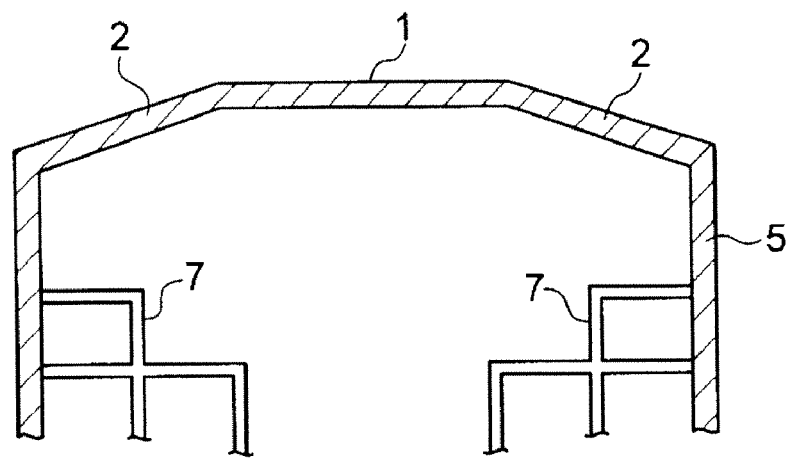
FIG. 3 is a view of a cross section cut off along a line III-III in FIG. 1.

In addition, in the nuclear power plant building 10, corner walls 6 made of reinforced concrete are provided at four angles that are corners of a body portion of the building of the square shape in plane cross section and under the corner horizontal slabs 4 as shown in FIG. 2. In addition, building walls 7 are formed at the center of the body portion of the building of the square shape in plane cross section.

Figure 4:
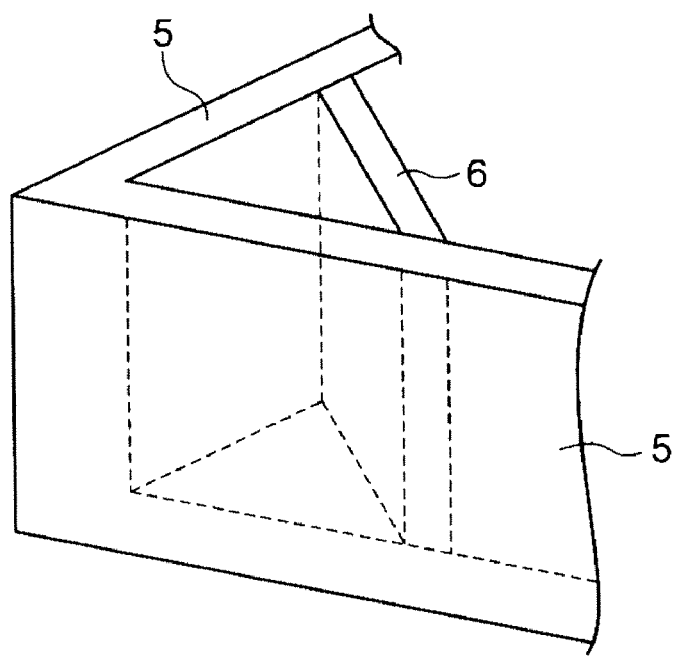
FIG. 4 is a perspective view showing schematically a construction of a corner wall of the nuclear power plant building according to the first embodiment of the present invention.

The corner wall 6 is of a flat plate shape, and is formed at a corner formed by both the outer walls 5 and fixed to the both the outer walls 5 as shown in FIG. 4. The corner wall 6 can be formed by a reinforced concrete plate with a thickness of about 2 meters, in the same manner as the outer wall 5. In addition, the shape of the corner wall 6 is not limited to a flat plate shape, but may be of a triangle pole shape with a rectangular triangle in plane cross section so as to fill in the space of the corner in FIG. 4.

The nuclear power plant building 10 is constructed so as to support the self-weights of the roof horizontal slab 1, the roof oblique slabs 2, the corner oblique slabs 3 and the corner horizontal slabs 4 by the corner walls 6 and the outer walls 5.

The nuclear power plant building 10 has a shape property approximately equal to that of a dome shape which is advantageous in strength by the arrangement of the roof horizontal slab 1, the roof oblique slabs 2 and the corner oblique slabs 3, and the corner horizontal slabs 4 and the corner walls 6 restrain the outer walls 5 from out-of-plane deformation. In addition, the outer walls 5 of the building and corner walls 6 in the vicinity of the outer surroundings support the self-weight of the roof.

Thus, according to the nuclear power plant building 10 of the present embodiment, the thickness of the roof horizontal slab 1, the roof oblique slabs 2, the corner oblique slabs 3 and the corner horizontal slabs 4 can be formed thick such as about 1.5 meters.

Thus, even in the building for the boiling water reactor where the body portion of the building is the rectangular shape in plane cross section and it is impossible to provide supports for the roof construction at the approximately central portion of the uppermost floor of the building, the building can be constructed by the walls and the ceiling with enough thickness not to generate damage and so on caused by collision with an incoming object.

In addition, as the roof is constructed by only the flat plates, the nuclear power plant building can be obtained where it is easy to insert reinforcing bars to increase strength and which can fill the requirement in construction with construction property and formation property.

Second Embodiment

Figure 5:
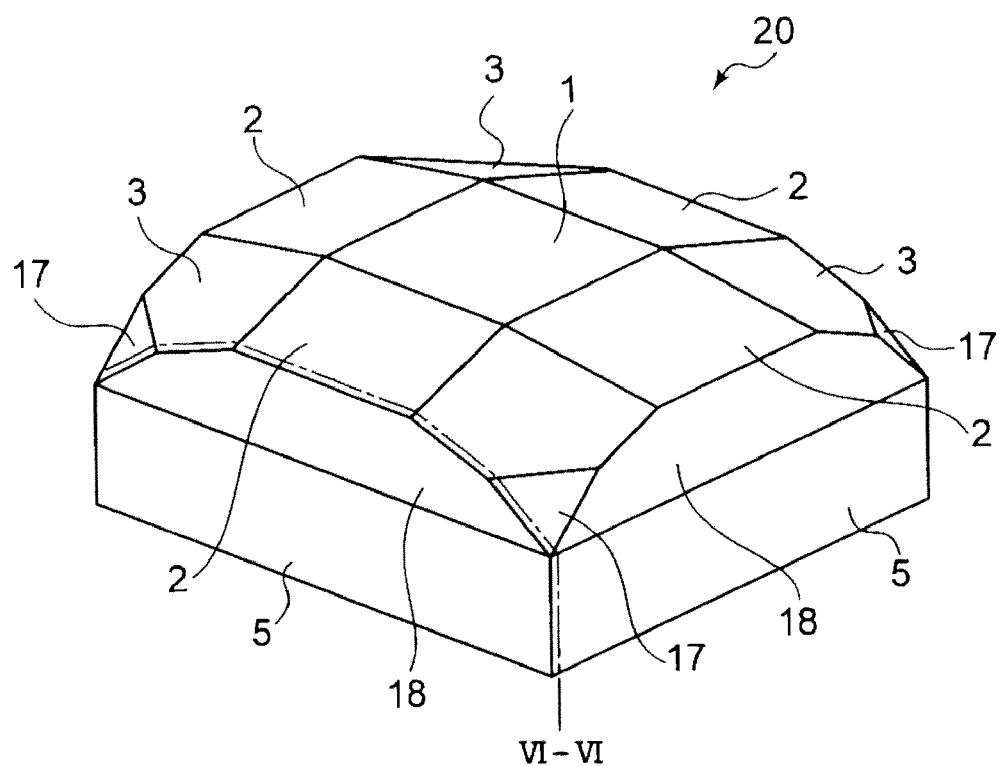
FIG. 5 is a perspective view showing a construction of a nuclear power plant building according to a second embodiment of the present invention.
Figure 6:
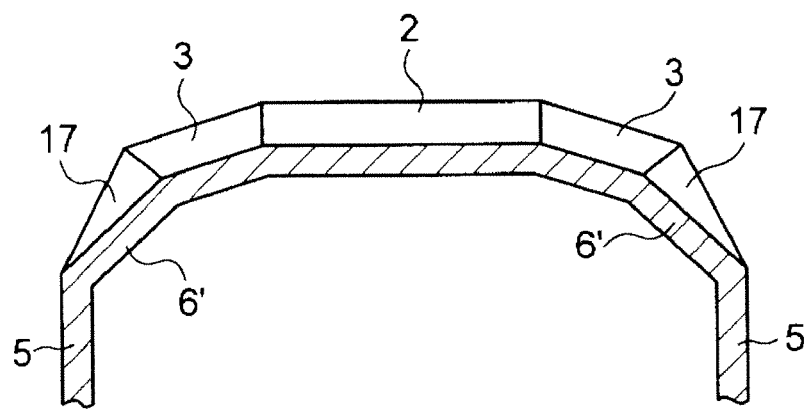
FIG. 6 is a view of a cross section cut off along a line VI-VI in FIG. 5.

A perspective view of a construction of a nuclear power plant building according to a second embodiment of the present invention is shown in FIG. 5, and a view of a cross section cut off along a line VI-VI in FIG. 5 is shown in FIG. 6.

A nuclear power plant building 20 according to the present embodiment is formed in the same way as the first embodiment except the following. In place of the corner horizontal slabs 4 arranged at the four angles of the nuclear power plant building 10 in FIG. 1, cutout portions 17 are formed. The cutout portions 17 are supported by corner walls 6'. In addition, side oblique slabs 18 are provided at the neighboring portions of the four outer walls 5 so that the roof is made in a configuration which changes shape gently as a whole.

In the nuclear power plant building 20 according to the present embodiment, the self weight of the roof is dispersed uniformly and can be supported by the outer walls 5 and the corner walls 6'.

Thus, according to the nuclear power plant building 20 of the present embodiment, the thickness of the roof horizontal slab 1, the roof oblique slabs 2 and the corner oblique slabs 3 can be formed thick such as about 1.5 meters.

Thus, in the same way as the nuclear power plant building 10 of the first embodiment, even in the building for the boiling water reactor where the body portion of the building is the rectangular shape in plane cross section and it is impossible to provide supports for the roof construction at the approximately central portion of the uppermost floor of the building, the building can be constructed by the walls and the ceiling with enough thickness not to generate damage and so on caused by collision with an incoming object.

Third Embodiment

Figure 7:
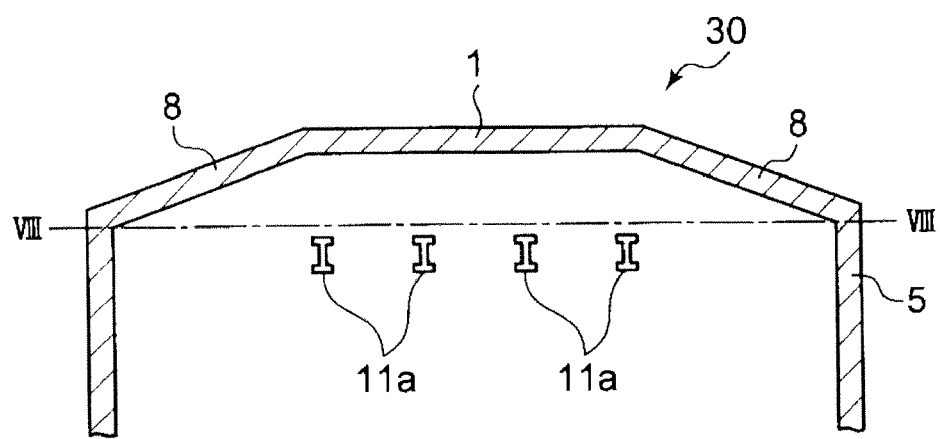
FIG. 7 is a cross sectional view showing a construction of a nuclear power plant building according to a third embodiment of the present invention
Figure 8:
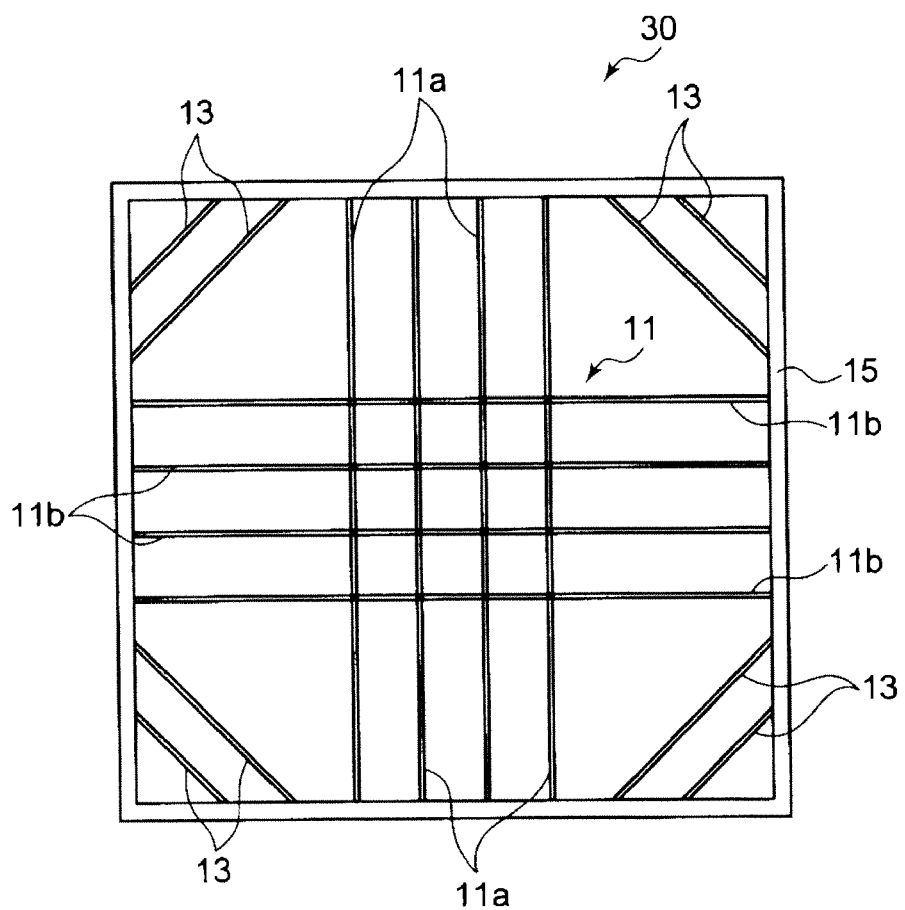
FIG. 8 is a plan view in case that is cut along a line VIII-VIII in FIG. 7.

A cross sectional view of a construction of a nuclear power plant building according to a third embodiment of the present invention is shown in FIG. 7, and a plan view cut off along a line VIII-VIII in FIG. 7 and seen from the above is shown in FIG. 8.

In a building construction 30, a roof of a truncated square pyramid shape with a dimension of about 60 meters square covers over a space of a square shape in plane cross section formed by four flat plane-like outer walls 5. The roof is provided with the roof horizontal slab 1 of the square shape locating at the central portion and roof oblique slabs 8 of a trapezoidal shape arranged around it to form a truncated square pyramid shape.

In addition, the roof horizontal slab 1, the roof oblique slabs 8 are each formed by a reinforced concrete plate of a thickness of about 1.5 meters. In addition, the outer walls 5 are each formed by a reinforced concrete plate of a thickness of about 2 meters.

In addition, in the building construction 30, opposing surface tensile members 11 are provided in a tense state between opposing surfaces of the outer walls 5 as shown in FIG. 8.

The opposing surface tensile members 11 are composed of tensile members 11a provided to tense in the up and down direction in the figure and tensile member 11b provided to tense in the right and left direction in the figure, and they are provided to be tensed from the ceiling out of alignment.

In addition, at the corners of the body portion of the building formed by the four outer walls 5, horizontal members 13 are respectively provided to tense the adjacent outer walls 5 nipping the angle.

The opposing surface tensile members 11 and the horizontal members 13 are each formed by a steel frame member of an H-shaped steel.

The opposing surface tensile member 11 is formed by an H-shaped steel with a beam width of 600 mm, a beam depth of 1600 mm, a web thickness of 25 mm and a flange thickness of 40 mm, for example.

In addition, the opposing surface tensile members 11 and the horizontal members 13 are not limited to the H-shaped steel, but may be composed of round bars and so on.

In the building construction 30, the opposing surface tensile members 11 and the horizontal members 13 restrain the outer walls 5 from out-of plane deformation.

Thus, according to the present embodiment, the thickness of the roof horizontal slab 1 and the roof oblique slabs 8 can be made thick such as about 1.5 meters.

Thus, even in the building for the boiling water reactor where the body portion of the building is the rectangular shape in plane cross section and it is impossible to provide supports for the roof construction at the approximately central portion of the uppermost floor of the building, the building can be constructed by the walls and the ceiling with enough thickness not to generate damage and so on caused by collision with an incoming object.

In addition, as provided with building construction of a simpler shape than that of the first embodiment, the nuclear power plant building can be obtained which can fill the requirement in construction with construction property and formation property.

Fourth Embodiment

One example of a construction method of the nuclear power plant building according to the first embodiment is shown in FIGS. 9A to 9F.

Figure 9A:
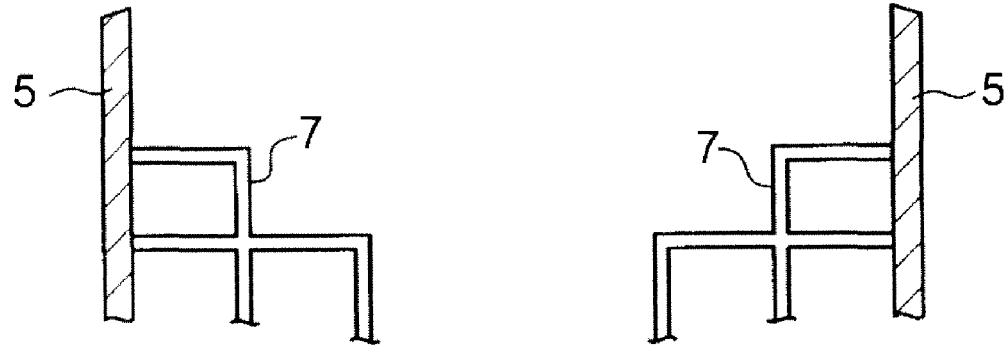
FIGS. 9A to 9F is a partial cross sectional view showing a construction method of a nuclear power plant building according to a fourth embodiment of the present invention.

First, the outer walls 5 and the building walls 7 are constructed as shown in FIG. 9A.

Figure 9B:
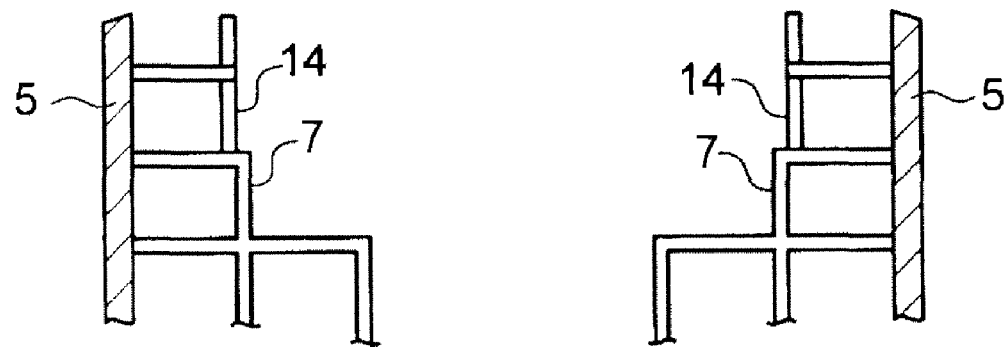

Next, temporary iron supports 14 are installed to the outer walls 5 and the building walls 7 as shown in FIG. 9B.

Figure 9C:
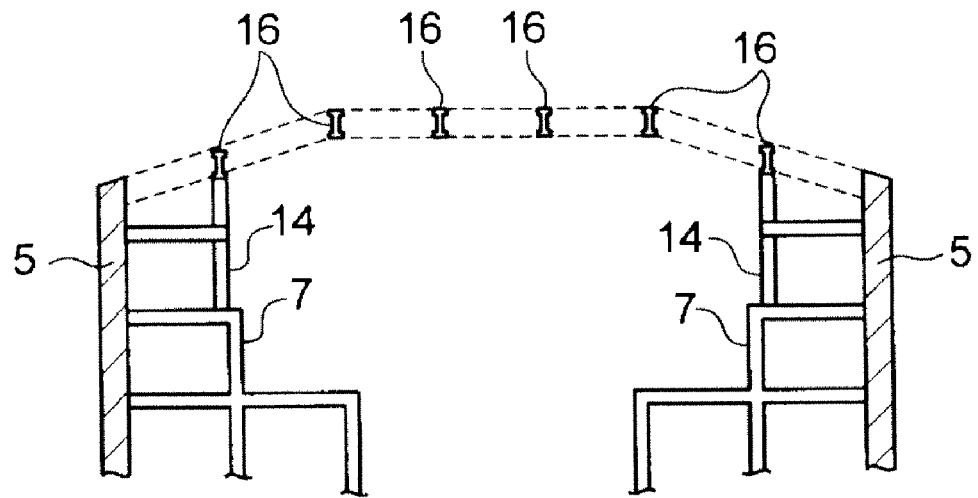

In addition, roof steel beams 16 each composed of an H-shaped steel are laid down on the temporary supports 14 as shown in FIG. 9C.

Figure 9D:
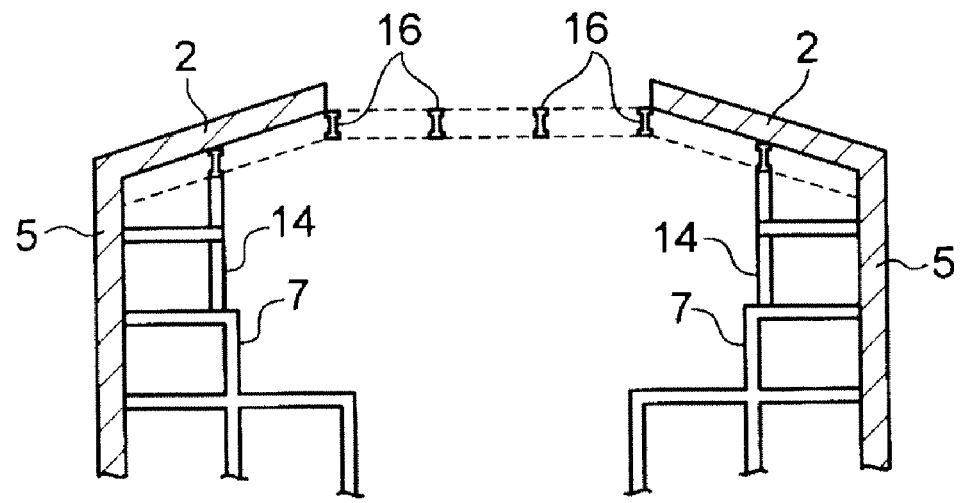
Figure 9E:
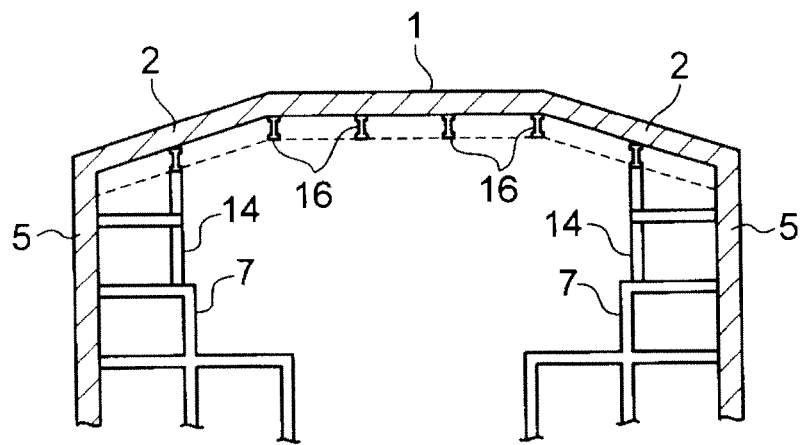

Next, the roof slabs are separately constructed from the outer walls 5 side as shown in FIGS. 9D and 9E. That is, firstly, the roof oblique slabs 2 are installed from the walls 5 side as shown in FIG. 9D, and then the roof horizontal slab 1 is arranged as shown in FIG. 9E.

Figure 9F:
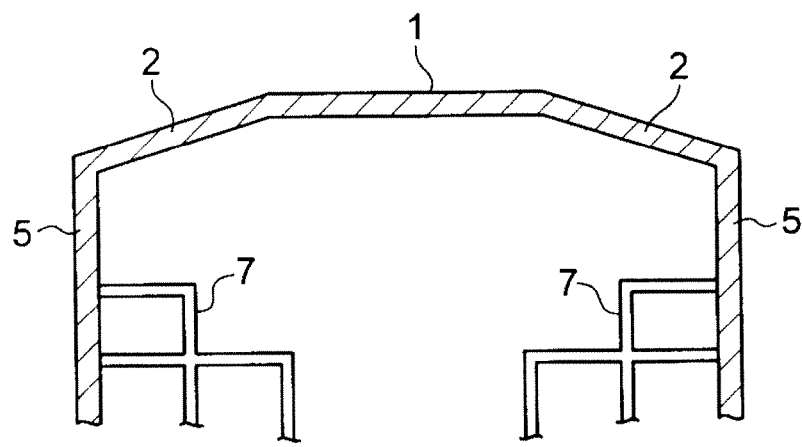

Lastly, the temporary supports 14 and the roof steel beams 16 are removed as shown in FIG. 9F so as to construct the nuclear power plant building according to the first embodiment shown in FIG. 3.

In addition, only the temporary supports 14 may be removed and the roof steel beams 16 may be left.

According to the construction method of the present embodiment, the nuclear power plant building can be constructed simply without using large equipment such as an overhead traveling crane.

Fifth Embodiment

Another example of a construction method of the nuclear power plant building according to the fifth embodiment is shown in FIGS. 10A to 10G. In addition, the same reference numerals are given to the same constructions in the fourth embodiment, and overlapping description will be omitted.

Figure 10A:
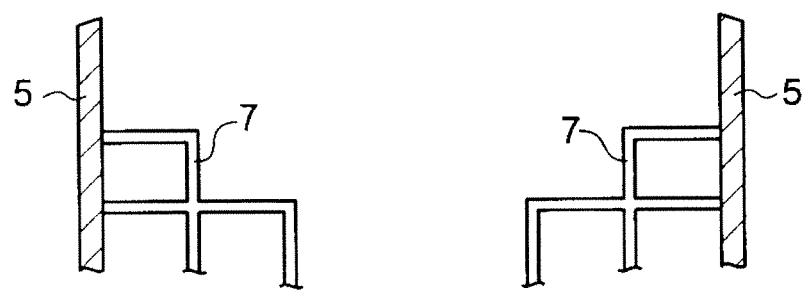
FIGS. 10A to 10G is a partial cross sectional view showing a construction method of a nuclear power plant building according to a fifth embodiment of the present invention.

First, the outer walls 5 and the building walls 7 are constructed as shown in FIG. 10A.

Figure 10B:
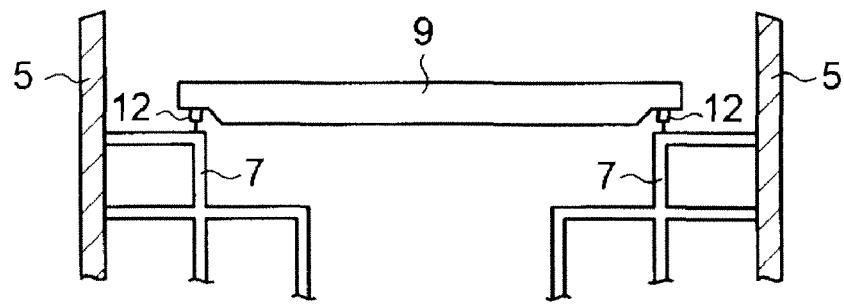

Next, a crane 9 is installed above the building walls 7 as shown in FIG. 10B. The crane 9 is installed along rails 12 formed on the building walls 7 so as to move freely in the vertical direction of a plane of paper.

Figure 10C:
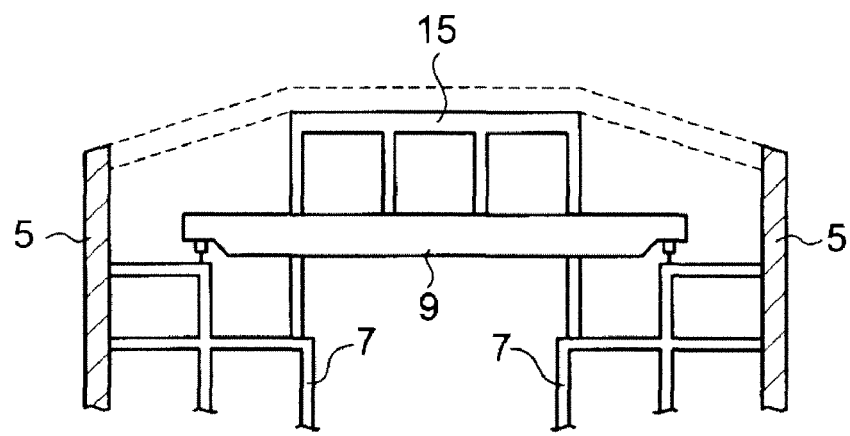
Figure 10D:
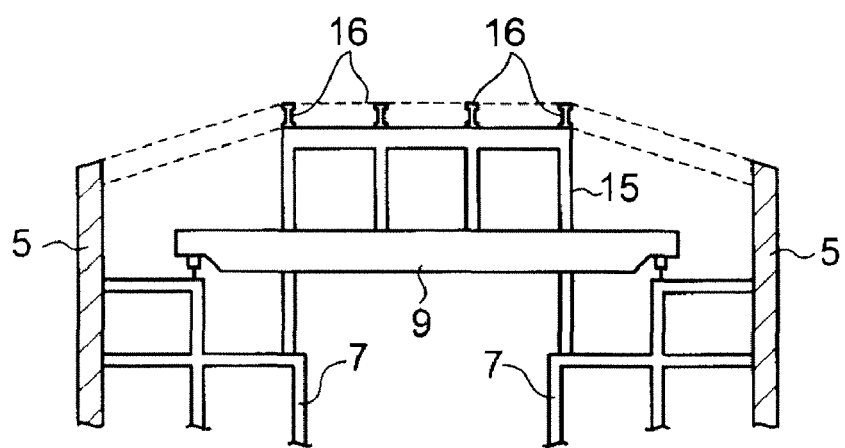

Next, temporary supports 15 are installed on the building walls 7 and the crane 9 as shown in FIG. 10C, and in addition, roof steel beams 16 each composed of an H-shaped steel are laid down on the temporary supports 15 as shown in FIG. 10D.

Figure 10E:
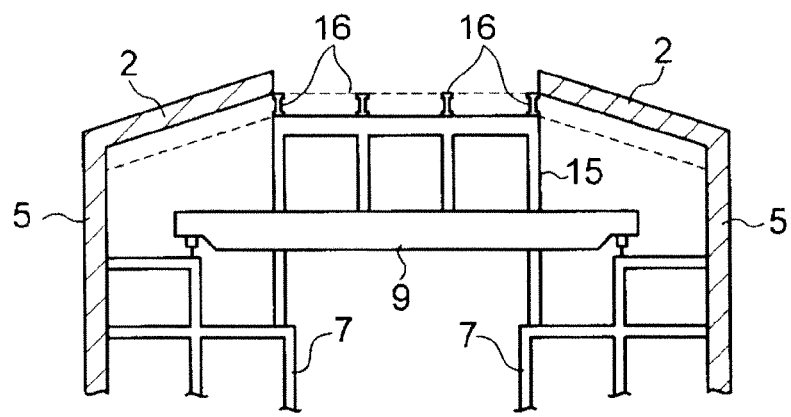
Figure 10F:
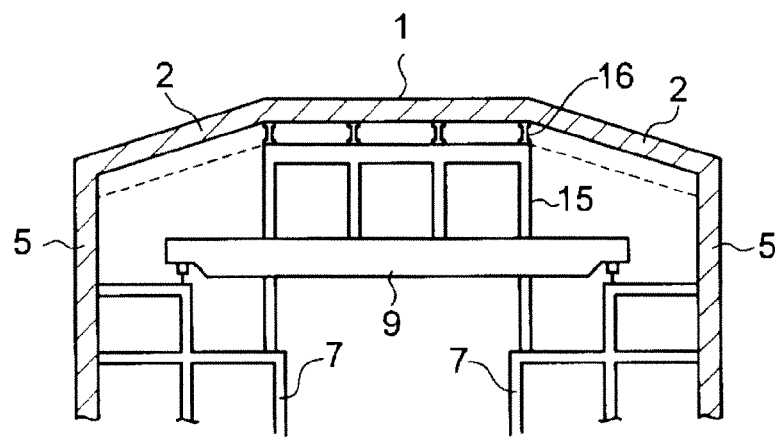

Next, the roof slabs are separately constructed from the outer walls 5 side as shown in FIGS. 10E and 10F. That is, firstly, the roof oblique slabs 2 are installed from the walls 5 side as shown in FIG. 10E, and then the roof horizontal slab 1 is arranged as shown in FIG. 10F.

Figure 10G:
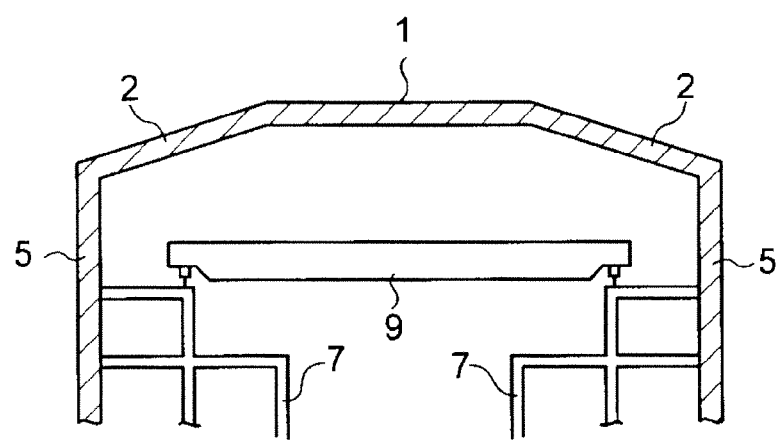

Lastly, the temporary supports 15 and the roof steel beams 16 are removed as shown in FIG. 10G so as to complete.

In addition, only the temporary supports 15 may be removed and the roof steel beams 16 may be left.

According to the present embodiment, the overhead traveling crane 9 is used as a part of the supporting construction in constructing the roof slabs. Thus, by using the overhead traveling crane 9 as a part of the supporting construction, the construction method can be made possible in which it is not necessary to install the supports for the roof at around the center of the operating floor.

Other Embodiments

In the first embodiment and the second embodiment, a multifaceted flat plane shape is shown as a shell construction, but without being limited to this shape, one with a ball shape is also included.

Figure 11:
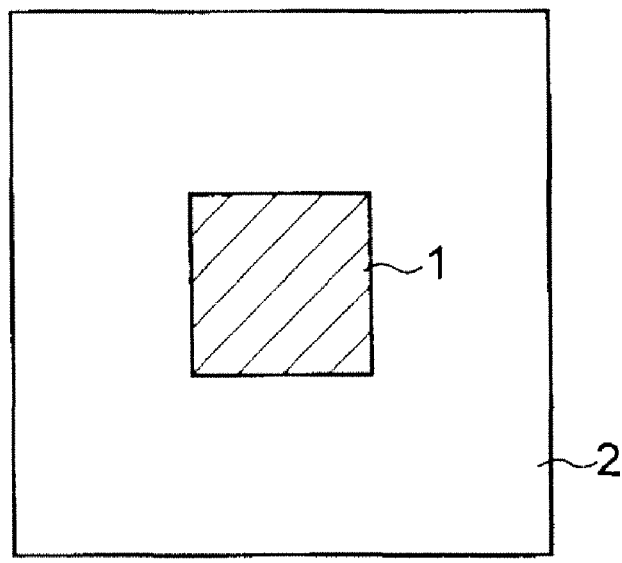
FIG. 11 is a plan view showing a construction procedure of a roof portion in the construction methods of the nuclear power plant building according to the fourth and fifth embodiments of the present invention.
Figure 12:
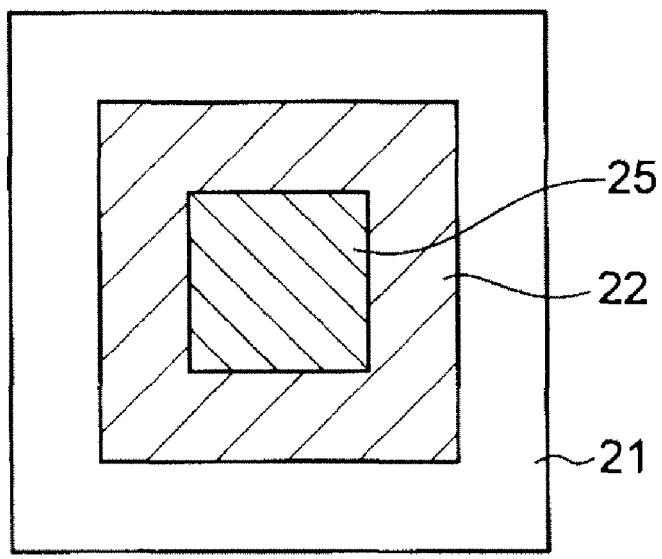
FIG. 12 is a plan view showing another construction procedure of a roof portion.
Figure 13:
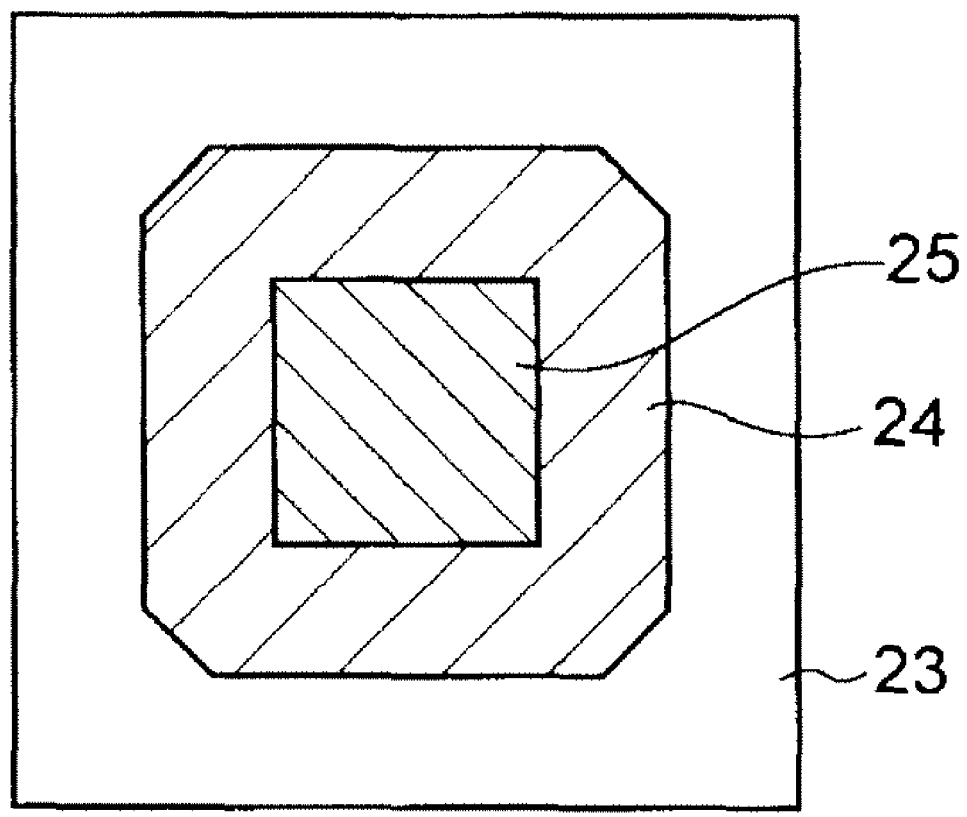
FIG. 13 is a plan view showing a further different construction procedure of a roof portion.

In addition, in the fourth and the fifth embodiments, a two stage construction is used to construct the roof horizontal slab 1 after constructing the roof oblique slabs 2 as shown in FIG. 11, but as shown in FIG. 12, after the roof oblique slabs 2 are constructed dividedly by a first construction 21 and a second construction 22, a third construction to construct the roof horizontal slab 1 may be performed. In addition, after a first construction 23 is performed to construct the roof oblique slabs 2 in a shape as shown in FIG. 13, a second construction 24 may be performed.

In addition, the construction method for the nuclear power plant building of the first embodiment is shown in the fourth and fifth embodiments, but the fourth and fifth embodiments can be applied to a construction method for the nuclear power plant buildings of the second and third embodiments.

What is claimed is:

1. A nuclear power plant building comprising:
   a building body portion; and
   a roof covering over the building body portion,
   wherein the building body portion is formed in a rectangular shape in plane cross section by four outer walls, and
   wherein the roof includes:
   a horizontal slab at a center of the roof;
   an oblique slab around the horizontal slab;
   a corner horizontal slab at a roof corner of the roof; and
   a corner wall under the corner horizontal slab and fixed to two of the outer walls that are adjacent to each other at the roof corner, and
   wherein the corner wall comprises a triangular pole shape to fill a space formed by the two outer walls at the roof corner.

* * * * *